(12) United States Patent
Hong

(10) Patent No.: US 6,915,322 B2
(45) Date of Patent: Jul. 5, 2005

(54) MULTIPLIER CAPABLE OF MULTIPLICATION OF LARGE MULTIPLICANDS AND PARALLEL MULTIPLICATIONS OF SMALL MULTIPLICANDS

(75) Inventor: John Suk-Hyun Hong, San Jose, CA (US)

(73) Assignee: DSP Group, Inc., Santa Clara, CA (US)

( * ) Notice: Subject to any disclaimer, the term of this patent is extended or adjusted under 35 U.S.C. 154(b) by 617 days.

(21) Appl. No.: 09/874,525

(22) Filed: Jun. 4, 2001

(65) Prior Publication Data

US 2001/0037352 A1 Nov. 1, 2001

Related U.S. Application Data

(63) Continuation-in-part of application No. 09/186,725, filed on Nov. 4, 1998, now Pat. No. 6,421,698.

(51) Int. Cl.[7] .............................................. G06F 7/52
(52) U.S. Cl. ...................................... 708/625; 708/620
(58) Field of Search .............................. 708/620, 625, 708/518

(56) References Cited

U.S. PATENT DOCUMENTS

| | | | | |
|---|---|---|---|---|
| 4,926,371 A | * | 5/1990 | Vassiliadis et al. ......... | 708/628 |
| 5,442,799 A | * | 8/1995 | Murakami et al. .......... | 708/626 |
| 5,586,070 A | * | 12/1996 | Purcell ....................... | 708/620 |
| 5,594,813 A | | 1/1997 | Fandrianto et al. | |
| 5,696,836 A | | 12/1997 | Yoshino et al. | |
| 5,751,622 A | * | 5/1998 | Purcell ....................... | 708/625 |
| 5,764,558 A | * | 6/1998 | Pearson et al. ............. | 708/625 |
| 5,870,618 A | | 2/1999 | Fujikawa et al. | |
| 5,973,742 A | | 10/1999 | Gardyne et al. | |
| 6,058,142 A | | 5/2000 | Ishikawa et al. | |
| 6,286,023 B1 | * | 9/2001 | Purcell et al. .............. | 708/620 |
| 6,286,024 B1 | * | 9/2001 | Yano et al. ................. | 708/625 |

FOREIGN PATENT DOCUMENTS

JP    9-44356    2/1997

* cited by examiner

*Primary Examiner*—Tan V. Mai
(74) *Attorney, Agent, or Firm*—David T. Millers

(57) ABSTRACT

A multiply unit uses four multipliers independently to perform for four parallel multiplications of single-width operands or uses the four multiplier cooperatively with an adder to perform a multiplication of double-width operands. In alternative embodiments, the adder operates in the same clock cycle as the multipliers or in a following clock cycle. Operand selection logic selects pairs of either single-width multiplicands or single-width partial multiplicands depending on for single or double-width multiplies.

4 Claims, 3 Drawing Sheets

MULTIPLIER CAPABLE OF MULTIPLICATION OF LARGE MULTIPLICANDS AND PARALLEL MULTIPLICATIONS OF SMALL MULTIPLICANDS

CROSS-REFERENCE TO RELATED APPLICATIONS

This application is a continuation-in-part of U.S. patent application Ser. No. 09/186,725, filed Nov. 4, 1998, now U.S. Pat. No. 6,421,698.

BACKGROUND

1. Field of the Invention

This invention relates to multipliers and multiplication methods capable of multiplying large multiplicands and performing multiple parallel multiplications of small multiplicands.

2. Description of Related Art

A multiplier is often one of the largest circuit units in a microprocessor or a digital signal processor (DSP). The size of a multiplier can be a particular problem in video processing where high-performance processing often requires parallel multiplications, Additionally, video processing often needs to multiply relatively small multiplicands (e.g., 8-bit time domain pixel data) and larger multiplicands (e.g., 16-bit frequency domain data.) A large multiplier designed for the larger multiplicands can multiply a pair of the smaller multiplicands, but providing a large number of large multipliers requires a large amount of circuit area and increases the manufacturing cost of an integrated circuit containing on-chip multipliers. Having two sets of multipliers, one set including a large number of smaller multipliers for small multiplicands and a second set containing a smaller number of larger multipliers for larger multiplicands, also requires a large circuit area without a corresponding increase in performance since the smaller multipliers generally cannot be used when multiplying larger multiplicands.

A processor or multiplier architecture is desired that requires a minimum circuit area, can multiply larger multiplicands, and perform multiple parallel multiplications of small multiplicands.

SUMMARY

In accordance with an aspect of the invention, a multiplier circuit includes a plurality of multipliers. The multipliers are capable of operating separately for parallel multiplications of multiplicands having a small data width or operating cooperatively form multiplications of multiplicands having a larger data width.

In one embodiment of the invention, a multiply unit includes one or more set of four multipliers and one or more adder that combines results from an associated set of multipliers. The multipliers in a set when operating independently generate four products, for example, four products of 8-bit values. When four multipliers operate cooperatively with the associated adder, the adder combines the results from the four multipliers to generate a product of two double-width operands, for example, the product of two 16-bit operands. To combine the results from the multipliers, the adder has an input ports that are larger than output ports of the multipliers, and the output port of each multiplier is coupled to bits within an input port of the adder according to the significance of the product determined by the multiplier. An output circuit for the multiply unit provides output signals from the multipliers when the multiply unit operates in a first mode (e.g., for parallel multiplications of single-width multiplicands), and provides an output signal from the adder when the multiply unit operates in a second mode (e.g., for multiplication of double-width multiplicands). The multiplication unit further includes an operand selection circuit that selects different portions of input operands for each multiplier. The portions selected for a multiplier typically depend on the processor's operating mode.

In accordance with another embodiment of the invention, a multiply unit includes a first multiplier, a second multiplier, a third multiplier, and a fourth multiplier coupled to an adder. The first multiplier is connected so that a least significant bit output from the first multiplier corresponds to a least significant bit in the adder. The second and third multipliers are connected so that a least significant bit output from the second multiplier and a least significant bit output from the third multiplier correspond to a first bit that is more significant than the least significant bit of the adder. The fourth multiplier is connected so that a least significant bit output from the fourth multiplier corresponds to a second bit that is more significant than the first bit in the adder. An output circuit provides output signals from the multipliers when the multiplier circuit operates in a first mode, and provides an output signal from the adder when the multiply unit operates in a second mode.

To control timing, latch circuits between the multipliers and the adder can register the output signals of the multipliers so that the multipliers perform multiplication operations during a first clock cycle and the adder combines the output signals during a second clock cycle. The adder can thus be in another portion of the circuit such as in an arithmetic logic unit, where the adder performs normal addition. Alternatively, the adder and the multipliers can operate during the same clock cycle.

Generally, the multiply unit further includes operand selection logic coupled to the multipliers. In the first mode, the selection logic provides a pair of single-width multiplicands to each multiplier for multiplication. In the second mode, the operand selection logic separates a first double-width multiplicand into a first partial multiplicand and a second partial multiplicand, separates a second double-width multiplicand into a third partial multiplicand and a fourth partial multiplicand, provides the first and third partial multiplicands to the first multiplier for multiplication, first and fourth partial multiplicands to the second multiplier for multiplication, second and third partial multiplicands to the third multiplier for multiplication, and second and fourth partial multiplicands to the fourth multiplier for multiplication. For signed multiplicands, two's complement units can provide the first and second double-width multiplicands representing absolute values of the respective signed input values, and sign correction circuits associated with the multipliers can correct the sign of the output signals from the multipliers.

In accordance with another embodiment of the invention, a method for operating a multiply unit containing a plurality of multipliers, includes: operating the multipliers separately to generate a plurality of output product values when the multiply unit operates in a first mode; and combining product values from the multipliers to generate only a single output product value when the multiply unit operates in a second mode. The output product values when the multiply unit operates in the first mode have a first data width that is about one fourth of a data width that the single output product value has when the multiply unit operates in the second mode.

BRIEF DESCRIPTION OF THE DRAWINGS

Use of the same reference symbols in different figures indicates similar or identical items.

DETAILED DESCRIPTION

In accordance with an aspect of the invention, a processor has an architecture that efficiently performs video data processing such as motion searches, horizontal filtering, vertical filtering, and half-pixel interpolation and performs general-purpose processing for general control of video, audio, and modem data processing. The processor is operable in different modes for different types of processing. The architecture provides multiple data path slices for parallel processing of pixel values during video processing modes and cooperative processing for a wider data path during a general processing mode. In particular, separate slices in a multiply unit perform multiple parallel multiplications for pixel processing or motion estimation and cooperative operations for general-purpose processing.

Figure 1:
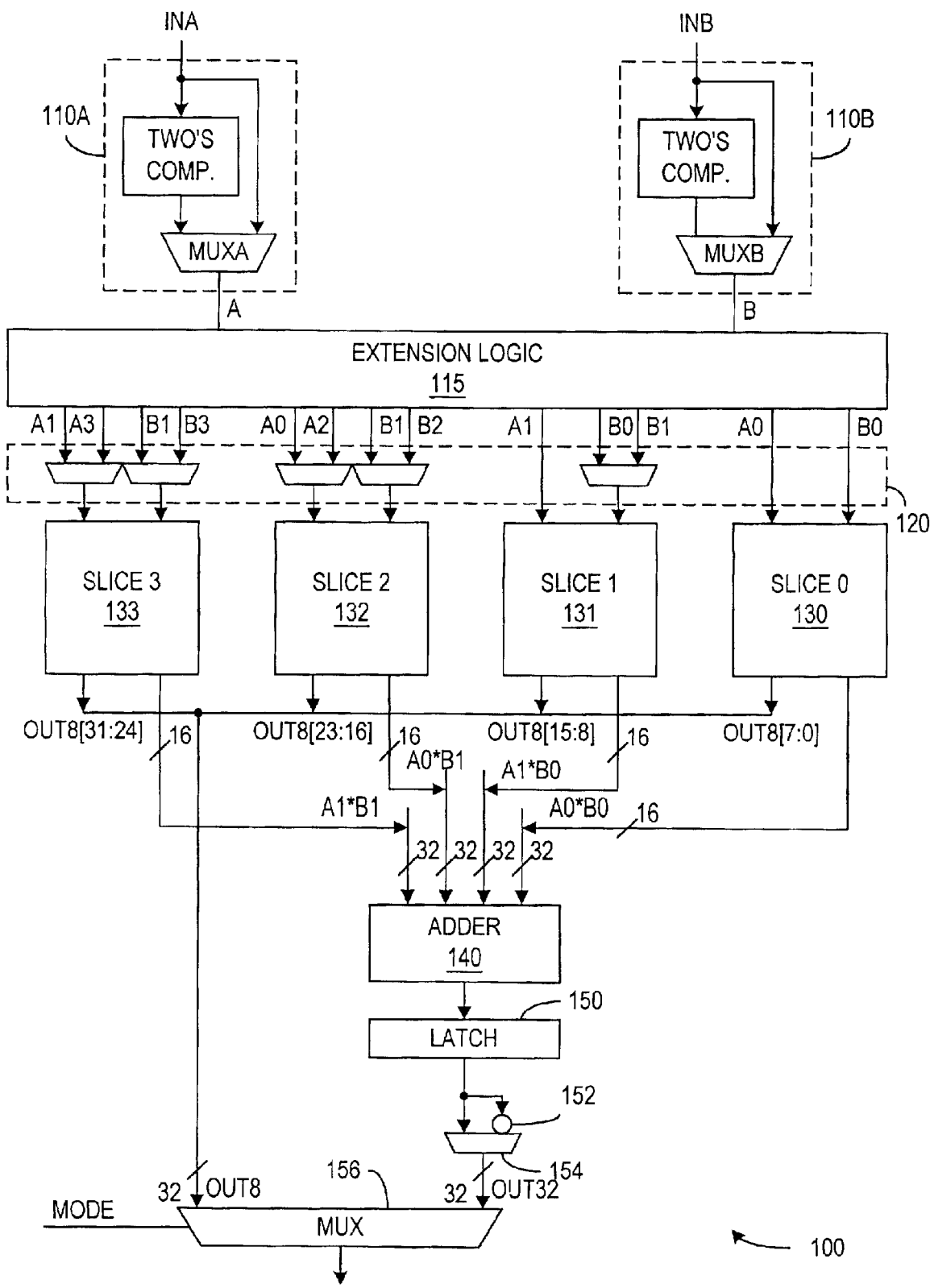
FIG. 1 is a block diagram of a multiply unit in accordance with an embodiment of the invention.

FIG. 1 illustrates a multiply unit 100 in accordance with an embodiment of the invention. Multiply unit 100 would typically be used in a processor, DSP, or other integrated circuit that performs arithmetic operations. U.S. patent application Ser. No. 09/186,725, which is hereby incorporated by reference in its entirety, further describes a video processor that contains two multiply unit of a type such as illustrated in FIG. 1.

Multiply unit 100 includes two's complement units 110A and 110B, extension logic 115, multiplicand selection logic 120, four multiplier slices 130, 131, 132, and 133, an adder 140, a latch 100, and output selection circuits 152, 154, and 156. Each of the multiplier slices 130, 131, 132, and 133 contains a multiplier that operates in parallel with the multipliers in the other slices. Depending on the operating mode of multiply unit 100, the multipliers in slices 130, 131, 132, and 133 operate either independently to produce four separate products or cooperatively to perform one multiplication of larger multiplicands. In the exemplary embodiment, multiply unit performs either four parallel multiplications of signed or unsigned 8-bit values or one multiplication of 16-bit values, and each multiplier is a 9×9-bit signed multiplier. 8×8-bit multipliers are sufficient in an embodiment requiring the capability to multiply only signed 8-bit operands or only unsigned 8-bit operands. More generally, embodiments of the invention can be applied to any data width according to the values being multiplied.

In the illustrated embodiment, multiply unit 100 receives two 32-bit signals INA and INB, which are input to two's-complement units 110A and 110B, respectively. The interpretation and processing of input signals INA and INB depends on the operating mode of multiply unit 100.

In a first operating mode (e.g., pixel processing mode), each 32-bit input signal INA or INB represents four 8-bit signed or unsigned operands, and extension logic 115 uses separate bytes of signals INA and INB to construct operands A0, A1, A2, A3, B0, B1, B2, and B3. In particular, for signed multiplications, extension logic 115 sign extends each 8-bit operand to provide 9-bit signed multiplicands A0, A1, A2, A3, B0, B1, B2, and B3. For unsigned multiplications, extension logic 115 adds a ninth bit having value zero to each 8-bit operand to create 9-bit positive multiplicands A0, A1, A2, A3, B0, B1, B2, and B3. Multiplicand selection logic 120 then selects pairs of 9-bit multiplicands (A0, B0), (A1, B1), (A2, B2), and (A3, B3) for slices 130, 131, 132, and 133, respectively.

In a second operating mode (e.g., a general processing mode), each signal INA and INB represents a 16-bit signed value, and two's complement units 110A and 110B perform a two's complement on any negative signed values to generate positive 16-bit values. The sign information that two's-complement units 110A and 110B determine from signals INA and INB is used in determining the sign of a final product as described further below. Extension logic 115 breaks the two 16-bit positive values into four 8-bit values and adds a ninth bit having value zero to each 8-bit value to generate partial multiplicands A0, A1, B0, and B1. In the second mode, multiplicand selection logic 120 then selects pairs of 9-bit multiplicands (A0, B0), (A1, B0), (A0, B1), and (A1, B1) for slices 130, 131, 132, and 133, respectively.

Figure 2:
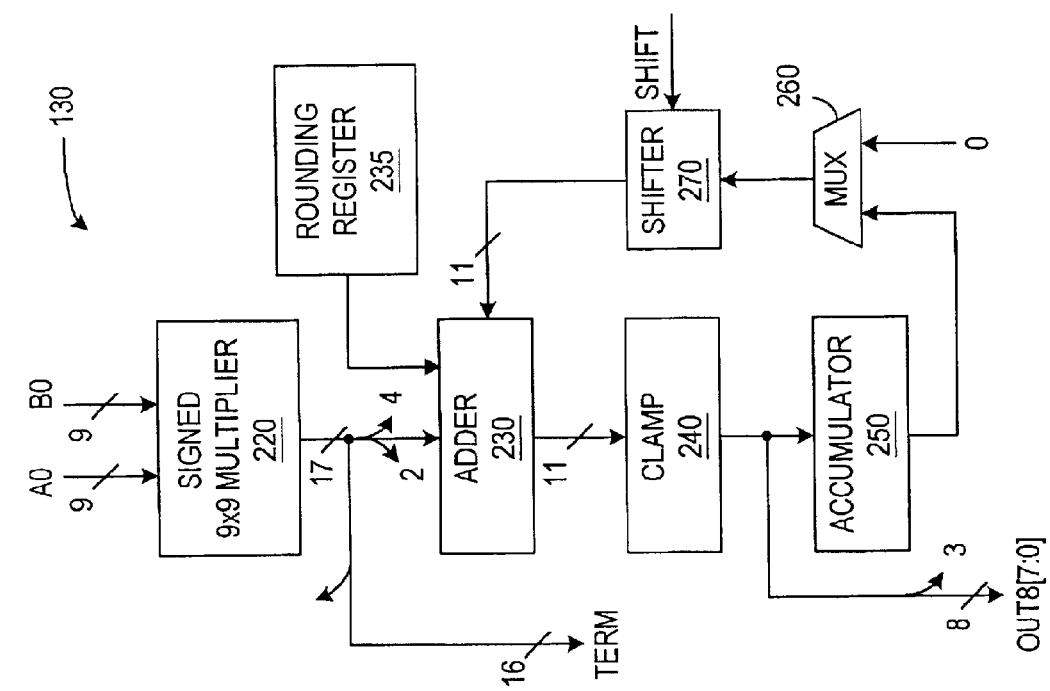
FIG. 2 is a block diagram of one of four small multiply units used in the multiply unit of FIG. 1.

FIG. 2 is a block diagram of slice 130, which includes a signed 9×9-bit multiplier 220 an adder 230, a rounding register 235, a clamp 240, an accumulator 250, a multiplexer 260, and a shifter 270. Slices 131, 132, and 133 have the same structure as slice 130. In slice 130, multiplier 220 performs a signed multiplication of two 9-bit signed multiplicands A0 and B0. The resulting product from multiplier 220 is nominally a 17-bit signed value but actually only requires at most 16-bits to express since the 9-bit signed values were extended from 8-bit signed or unsigned values. The sign bit of the 17-bit product is stripped off to provide signal TERM, which is a 16-bit signal representing the product of two unsigned 8-bit values. As described further below, signal TERM is for combination with similar product signals from the other multipliers when multiply unit 100 operates in the second mode to multiply 16-bit multiplicands.

The data path to adder 230 is for separate multiply, multiply-and-accumulate operations, and filtering operations that multiply unit 100 performs on 8-bit values. Two sign bits can be stripped off the 17-bit product signal without loss of information in this data path. Additionally, the four least significant bits are ignored in exemplary embodiment, which limits a result signal OUT8 to eight bits. As a result, in the exemplary embodiment, adder 230 receives an 11-bit product signal from multiplier 220.

Adder 230 adds a value from a register 235 and/or a value from shifter 270 to the product from multiplier 220. Register 235 stores a value that selects a rounding mode that applies if the sum from adder 230 is right shifted, for example, for rounding down or up after a divide by two. Shifter 270 provides to adder 230 a value that is either zero or derived from the content of accumulator 250. For a simple multiplication, a multiplexer 260 provides a zero-valued data signal to shifter 270, and shifter 270 provides a zero-valued addend to adder 230. For a multiply-and-accumulate operation, multiplexer 260 selects the value from accumulator 250. Shifter 270 can either shift the accumulated value from accumulator 250 or leave the accumulated value unchanged. For normal multiply-and-accumulate operations, adder 230 receives and adds the unchanged accumulated value to the product output from multiplier 220. For filter operations, shifter 270 shifts the accumulated value according to a desired weighting between the product and the accumulated value.

A clamp circuit 240 selects eight output bits from the operation performed in slice 130 and handles overflow situations by clamping the sum from adder 230 as the operation requires. A result signal OUT8[7:0] from clamp circuit 240 of slice 130 represents a clamped product of two signed or unsigned values A0 and B0.

In general processing mode, multiply unit 100 performs a multiplication of two 16-bit operands derived from signals INA and INB. Two's complement units 110A and 110B provide positive 16-bit values in two operands A and B and separately provide two sign bits for selecting the signs of resulting products of signed multiplications. For signed multiplication, two's-complement units 110A and 110B determine the two's-compliments of any negative 16-bit values in the original operands INA and INB and determine the sign bits accordingly. For unsigned multiplication, the 32-bit signals INA and INB are simply truncated to sixteen bits.

Multiply unit 100 performs a 16×16-bit multiplication to generate a 32-bit output OUT32. Specifically, slices 130 to 133 multiply a 16-bit value including bytes A0 and A1 of operand A by a 16-bit value including bytes B0 and B1 of operand B. Multiply unit 100 ignores bytes A2, A3, B2, and B3 in general processing mode.

In FIG. 1, slices 130 to 133 operate cooperatively for multiplication of two 16-bit positive values. In particular, multipliers 220 in slices 130, 131, 132, and 133 respectively determine products A0*B0, A1*B0, A0*B1, and A1*B1. The products are 16-bit values that are portions of 32-bit values input to an adder 140. Product A0*B0 provides 16 bits aligned on the right with bit 0 of adder 140. Products A0*B1 and A1*B0 are aligned on the right with bit 8 of adder 140, and product A1*B1 is aligned on the right with bit 16 of adder 140. The sum from adder 140, which is a 32-bit value representing the product of positive 16-bit values, is held in a latch 150. For signed multiplications, a multiplexer 154 selects the positive product from latch 150 or a one's-complement value of the product according to sign bits from two's-complement units 110A and 110B. An inverter 152 inverts each bit in the positive product to generate the one's-complement value. An arithmetic logic unit (ALU) completes the multiplication by adding one to the result thereby completing a two's-complement for negative products. The ALU can simultaneously add a further value from an accumulator (not shown) for multiply-and-accumulate operations.

Figure 3:
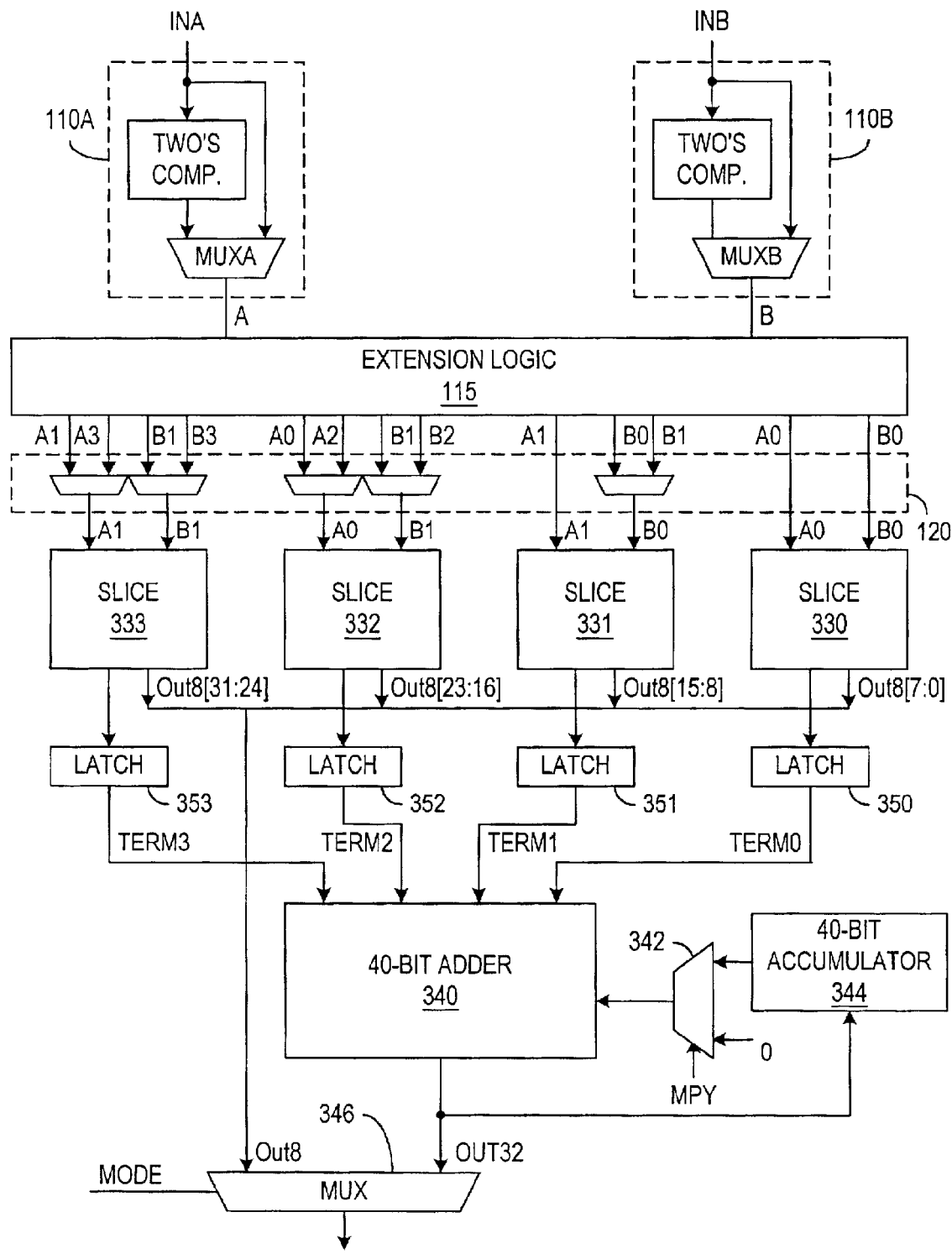
FIG. 3 is a block diagram of a multiply unit in accordance with another embodiment of the invention.

FIG. 3 illustrates an multiply unit 300, which includes four slices 330, 331, 332, and 333 in accordance with an alternative embodiment of the invention. In general processing mode, slices 330, 331, 332, and 333 cooperate to perform one 16×16-bit multiplication. For the 16×16-bit multiplication, two's complement units 110A and 110B performs a two's complement on any negative 16-bit multiplicands and provide two positive 16-bit multiplicands A and B to the portion of multiplier 100 shown in FIG. 3. Two complement units 110A and 110B also provide sign bits SIGNA and SIGNB indicating the signs of the respective input values INA and INB of two's complement units 110A and 110B, and an XOR operation on sign bits SIGNA and SIGNB indicates the sign SIGNO of the final product.

For the 16×16-bit multiplication, extension logic 115 and multiplicand selection logic 120 generate two 9-bit multiplicands A0 and A1 from 16-bit operand A and generates two 9-bit multiplicands B0 and B1 from 16-bit operand B. Slices 330, 331, 332, and 333 respectively received operand pairs (A0, B0), (A1, B0), (A0, B1), and (A1, B1) for multiplications.

Figure 4:
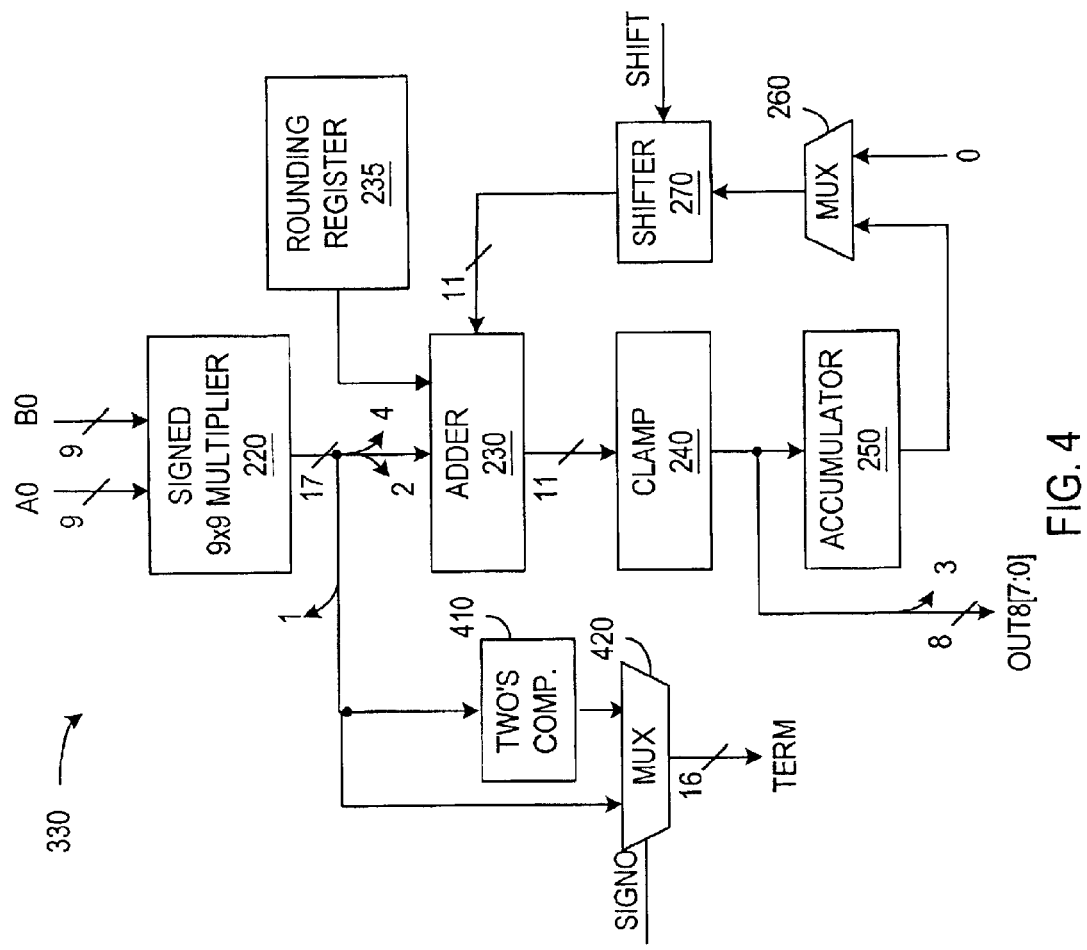
FIG. 4 is a block diagram of one of four small multiply units used in the multiply unit of FIG. 3.

Slices 330, 331, 332, and 333, which perform four multiplications in parallel, contain similar or identical components, and FIG. 4 illustrates structure of slice 330 as an example. Slice 330 includes signed 9×9-bit multiplier 220, adder 230, clamp circuit 240, accumulator 206, multiplexer 207, and shifter 260 that operate in the manner described above in reference to slice 130 (FIG. 2). Slice 330 differs from slice 130 in that slice 330 includes a two's complement unit 410 and a multiplexer 420 connected to the output of multiplier 220. Two's complement unit 410 performs a two's complement on a 16-bit product output from multiplier 220 as a result of multiplying two unsigned 8-bit multiplicands (e.g., A0 and B0). Multiplexer 420 then selects either the negative value from two's complement unit 410 or the positive value from multiplier 220 depending on the desired sign SIGNO of the final output product OUT32.

Returning to FIG. 3, latch circuits 350, 351, 352, and 353 register respective output signals ROUT0, ROUT1, ROUT2, and ROUT3 from respective slices 330, 331, 332, and 333 at the end of a first clock cycle of a 16×16-bit operation. Latch circuits 350, 351, 352, and 353 can also expand output signals ROUT0, ROUT1, ROUT2, and ROUT3, which are 16-bit signed values, to 40-bit values TERM0, TERM1, TERM2, and TERM3. The expansion places each signal ROUT0, ROUT1, ROUT2, and ROUT3 in the appropriate bit position for addition by a 40-bit adder 340. In particular, latch circuit 350 sign extends output signal ROUT0 to 40 bits. Latch circuits 351 and 352 add eight zero-valued bits to the right of respective signals ROUT1 and ROUT2 and sign extend each resulting 24-bit value to 40 bits. Latch circuit 353 adds sixteen zero-valued bits to the right of signal ROUT3 and sign extends the resulting 32-bit value to 40 bits.

For a 16×16-bit multiply operation, adder 340 adds the values of the four signals TERM0, TERM1, TERM2, and TERM3 during a second clock cycle of the operation. For a 16×16-bit multiply-and-accumulate operation, adder 340 adds the values of the four signals TERM0, TERM1, TERM2, and TERM3 to a 40-bit value that a 40-bit accumulator 344 provides via a multiplexer 342. The multiplier embodiment of FIG. 3 thus uses slices 330, 331, 332, and 333 to perform multiplications during a first clock cycle and adder 340 to combine the results of the multiplications during a second clock cycle. In contrast, for 16×16-bit multiplications in the multiplier embodiment of FIG. 2, slices 130, 131, 132, and 133 and adder 140 perform multiplications and additions in the same clock cycle. Accordingly, the timing required in the embodiment of FIG. 3 may be easier to achieve. Additionally, in a processor, adder 340 can be part of an arithmetic logic unit that performs general arithmetic operations not limited to multiply operations associated with multiply unit 300.

Table 1 contains verilog code for implementing an embodiment of multiply unit 300 of FIG. 3.

TABLE 1

Verilog Code for Multiply Unit Emobidment

```
[module mac_rtl (reset, clk, ina, inb, out, mpy);
input reset, clk, mpy;
input [15:0]    ina;
input [15:0]    inb;
output [39:0]   out;
wire [39:0]     addout;
wire [39:0]     muxout;
reg [39:0]      accout;
```

TABLE 1-continued

Verilog Code for Multiply Unit Emobidment

```
wire [8:0] ina0,      ina1, ina2, ina3;
wire [8:0] inb0,      inb1, inb2, inb3;
wire [15:0]           out0, out1, out2, out3;
wire [15:0]           tout0, tout1, tout2, tout3;
reg [15:0]            rout0, rout1, rout2, rout3;
wire [31:0]           tempout;
wire [15:0]           tina, tinb;
wire signa, signb, signo;
reg rsigno;
// This will be previous stage calculation - two's complement block
assign        tina = ina[15] ? (~ina[15:0] + 1) : ina[15:0];
assign        tinb = inb[15] ? (~inb[15:0] + 1) : inb[15:0];
// assign the sign bits
assign        signa = ina[15];
assign        signb = inb[15];
assign  signo = ina[15] ^ inb[15];
assign        ina0 = {1'b0,tina[7:0]};
assign        inb0 = {1'b0,tinb[7:0]};
assign        ina1 = {1'b0,tina[7:0]};
assign        inb1 = {1'b0,tinb[15:8]};
assign        ina2 = {1'b0,tina[15:8]};
assign        inb2 = {1'b0,tinb[7:0]};
assign        ina3 = {1'b0,tina[15:8]};
assign        inb3 = {1'b0,tinb[15:8]};
mult9 mul0 (.ina(ina0), .inb(inb0), .out(out0));
mult9 mul1 (.ina(ina1), .inb(inb1), .out(out1));
mult9 mul2 (.ina(ina2), .inb(inb2), .out(out2));
mult9 mul3 (.ina(ina3), .inb(inb3), .out(out3));
assign        tout0 = signo ? (~out0+1) : out0;
assign        tout1 = signo ? (~out1+1) : out1;
assign        tout2 = signo ? (~out2+1) : out2;
assign        tout3 = signo ? (~out3+1) : out3;
always @ (posedge clk) begin
      if (reset) begin
            rout0 <= #1 16'b0;
            rout1 <= #1 16'b0;
            rout2 <= #1 16'b0;
            rout3 <= #1 16'b0;
      end else begin
            rout0 <= #1 tout0;
            rout1 <= #1 tout1;
            rout2 <= #1 tout2;
            rout3 <= #1 tout3;
      end
end
// pipline sign signal
always @ (posedge clk) begin
      if (reset)    rsigno <= #1 1'b0;
      else          rsigno <= #1 signo;
end
// mux description
assign muxout = mpy ? 40'h0 : accout;
// adder description
wire  [39:0] term3 = rsigno ? {{8{rout3[15]}}, rout3, 16'h0}:
{8'h0,rout3,16'h0};
wire  [39:0] term2 = rsigno ? {{16{rout2[15]}}, rout2, 8'h0}:
{16'h0,rout2,8'h0};
wire  [39:0] term1 = rsigno ? {{16{rout1[15]}}, rout1, 8'h0}:
{16'h0,rout2,8'h0};
wire  [39:0] term0 = rsigno ? {{24{rout0[15]}}, rout0} : {24'h0,rout0};
assing         addout = term3 + term2 + term1 + term0 + muxout;
// accumulator description
always @ (posedge clk) begin
      if (reset)    accout <= #1 40'h0;
      else          accout <= #1 addout;
end
assign        out = addout;
endmodule
```

Although the invention has been described with reference to particular embodiments, the description is only an example of the invention's application and should not be taken as a limitation. In particular, the data widths described herein are merely examples in particular embodiments for the invention, but embodiments of the invention can be implemented for data widths other than the examples described here. Various other adaptations and combinations of features of the embodiments disclosed are within the scope of the invention as defined by the following claims.

I claim:

1. A multiply unit comprising:

a first multiplier, a second multiplier, a third multiplier, and a fourth multiplier;

an adder having input ports which are larger than output ports of the multipliers, wherein an output port of the first multiplier is coupled to least significant bits of an input port of the adder, output ports of the second and third multipliers are coupled to input ports of the adder but not least or most significant bits of the input ports, and an output port of the fourth multiplier is coupled to an input port of the adder but not the least significant bits of the input port;

an output circuit that provides output signals from the multipliers when the multiplier circuit operates in a first mode, and provides an output signal from the adder when the multiply unit operates in a second mode; and an operand selection circuit coupled to the first, second, third, and fourth multipliers, wherein:

in the first mode, the operand selection circuit applies a first portion of a first operand signal and a first portion of a second operand signal to the first multiplier, applies a second portion of the first operand signal and a second portion of the second operand signal to the second multiplier, applies a third portion of the first operand signal and a third portion of the second operand signal to the third multiplier, and applies a fourth portion of the first operand signal and a fourth portion of the second operand signal to the fourth multiplier; and in the second mode, the operand selection circuit applies the first portion of the first operand signal and the first portion of a second operand signal to the first multiplier, applies the second portion of the first operand signal and the first portion of the second operand signal to the second multiplier, applies the second portion of the first operand signal and the first portion of the second operand signal to the third multiplier, and applies the second portion of the first operand signal and the second portion of the second operand signal to the fourth multiplier.

2. The multiplier of claim 1, wherein:

each multiplier is capable over multiplying an 8-bit value by an 8-bit value to generate a 16-bit result;

the first multiplier has an output port including 16 least significant bits coupled to 16 least significant bits of a first input port of the adder;

the second multiplier has an output port including 16 least significant bits coupled to bits eight through twenty-three of a second input port of the adder;

the third multiplier has an output port including 16 least significant bits coupled to bits eight through twenty-three of a third input port of the adder; and the fourth multiplier has an output port including 16 least significant bits coupled to seventeen through thirty-two of a fourth input port of the adder.

3. A method for operating a multiply unit containing a plurality of multipliers, comprising:

operating the multipliers separately to generate a plurality of output product values when the multiply unit operates in a first mode; and combining product values from the multipliers to generate only a single output product value when the multiply unit operates in a second mode, wherein:

in the first mode, the method further comprises: separating input data on a first input bus into a first, second, third, and fourth multiplicands; separating input data on a second input bus into fifth, sixth, seventh, and eighth multiplicands, and having first, second, third, and fourth of the multipliers respectively multiply the first and fifth multiplicands, the second and sixth multiplicands, the third and seventh multiplicands, the fourth and eight multiplicands; and in the second mode, the method further comprises: separating input data on the first input bus into first and second multiplicands; separating input data on the second input bus into fifth and sixth multiplicands, and having first, second, third, and fourth of the multipliers respectively multiply the first and fifth multiplicands, the first and sixth multiplicands, the second and fifth multiplicands, the second and sixth multiplicands.

4. The method of claim 3, wherein the output product values when the multiply unit operates in the first mode have a first data width that is one fourth of a data width that the single output product value has when the multiply unit operates in the second mode.

* * * * *